US011879482B1

(12) United States Patent
Dumais et al.

(10) Patent No.: US 11,879,482 B1
(45) Date of Patent: Jan. 23, 2024

(54) MODULAR CEILING FIXTURE MOUNTING DEVICE AND METHOD OF USE

(71) Applicants: Christopher Dumais, Denton, TX (US); Carmen Dumais, Denton, TX (US)

(72) Inventors: Christopher Dumais, Denton, TX (US); Carmen Dumais, Denton, TX (US)

( * ) Notice: Subject to any disclaimer, the term of this patent is extended or adjusted under 35 U.S.C. 154(b) by 0 days.

(21) Appl. No.: 17/978,166

(22) Filed: Oct. 31, 2022

(51) Int. Cl.
*F04D 29/60* (2006.01)
*F21S 8/00* (2006.01)
*F04D 25/08* (2006.01)

(52) U.S. Cl.
CPC ......... *F04D 29/601* (2013.01); *F04D 25/088* (2013.01); *F21S 8/036* (2013.01)

(58) Field of Classification Search
CPC ....... F04D 29/601; F04D 25/088; F21S 8/036
USPC ................................. 248/629, 123.11, 123.2
See application file for complete search history.

(56) References Cited

U.S. PATENT DOCUMENTS 4,447,031 A * 5/1984 Souder, Jr. ......... F16M 11/2014 248/921
4,846,434 A * 7/1989 Krogsrud ............... F16M 13/02 248/123.11
5,149,042 A * 9/1992 Dumais ................. F04D 29/601 248/340
5,232,347 A 8/1993 VonBergen
5,558,501 A * 9/1996 Wang .................... F04D 25/088 416/246
6,027,309 A 2/2000 Rawls
6,431,822 B1 * 8/2002 Schwing ............... F04D 29/601 416/244 R
7,374,138 B2 * 5/2008 Marshall ................... A47F 7/00 40/607.04
8,348,220 B2 * 1/2013 Carter ..................... F16M 13/02 248/224.7
2005/0117342 A1 * 6/2005 Perlo ....................... F21S 6/006 362/253
2020/0132082 A1 * 4/2020 Tanner .................. F04D 25/088

FOREIGN PATENT DOCUMENTS

CA 2383265 11/2001

* cited by examiner

*Primary Examiner* — Muhammad Ijaz

(57) ABSTRACT

A modular ceiling fixture mounting device for mounting a ceiling fixture without attaching it to a ceiling includes first, second, and third tubes, which are selectively attachable, and a connector, which is attached to the third tube. A second section of the first tube extends from an upper end of a first section. A rear edge of the first section is positionable along an intersection of walls of a room. An article of mounting hardware is inserted through mounting holes positioned in the first section to attach the first tube to a structural element of at least one of the walls. The second section extends toward a ceiling of the room, the second tube extends substantially perpendicularly to the first section into the room, and the third tube is substantially parallel to the walls. A fixture can be suspended in the room by attachment to the connector.

6 Claims, 6 Drawing Sheets

MODULAR CEILING FIXTURE MOUNTING DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fixture mounting devices and more particularly pertains to a new fixture mounting device for mounting a ceiling fixture without attaching it to a ceiling. The present invention discloses a fixture mounting device which is modular, to facilitate shipping, and which requires a single article of mounting hardware to secure it in place.

(2) Description of Related Art Including Information Disclosed Under 37 CFR 1.97 and 1.98

The prior art relates to fixture mounting devices. The most relevant prior art is U.S. Pat. No. 5,149,042, of which one of the current inventors is the sole inventor and the entirety of which is incorporated herein by reference. The present invention includes two novel and unanticipated improvements to the device that was disclosed in U.S. Pat. No. 5,149,042. Firstly, the present invention replaces the unibody construction of the prior art device with a modular device, which is advantageous for shipping. That such a modular device could support a load of a fixture was not anticipated by the inventor of U.S. Pat. No. 5,149,042, nor would it have been anticipated by others skilled in the art of fixture mounting devices. Significant experimentation by the inventors of the present invention was required to discover a modular device capable of supporting the load of the fixture.

Secondly, the present invention is configured to be mounted using a single article of mounting hardware, whereas the prior art device required two articles of mounting hardware. This configuration for mounting the fixture mounting device provides a stronger connection, is quicker, provides for easier alignment, and is fail safe as a corner between the walls comprises solid wood for engaging the single article of mounting hardware. Successful mounting of a fixture mounting device using a single article of mounting hardware was not anticipated by the inventor of U.S. Pat. No. 5,149,042, nor would it have been anticipated by others skilled in the art of attaching fixture mounting devices to walls. Significant experimentation by the inventors of the present invention was required to develop a configuration of the fixture mounting device capable of being mounted using a single article of mounting hardware.

BRIEF SUMMARY OF THE INVENTION

An embodiment of the disclosure meets the needs presented above by generally comprising a first tube, a second tube, a third tube, and a connector. The first tube has a cross-sectional profile that is substantially trapezoidal and comprises a first section and a second section, which extends from an upper end of the first section. A rear edge of the first section is configured to be positioned along an intersection of walls of a room so that each rear face of a pair of rear faces of the first section abuts a respective one of the walls. The second section extends angularly from the first section toward a ceiling of the room. At least two mounting holes are positioned in the first section proximate to the upper end. Each mounting hole is aligned with an associated mounting hole. The mounting hole and the associated mounting hole are configured for insertion of an article of mounting hardware to fixedly attach the first tube to a structural element of at least one of the walls. The second tube is selectively attachable to the second section distal from the first section so that the second tube extends substantially perpendicularly to the first section into the room. The third tube is selectively attachable to the second tube, distal from the first tube, so that the third tube is substantially parallel to the walls. The connector is attached to the third tube distal from the second tube and is configured to selectively attach to a fixture so that the fixture is suspended in the room.

Another embodiment of the disclosure includes a method of mounting a fixture. The method comprises a provision step, which entails providing a fixture and a modular ceiling fixture mounting device, according to the disclosure above. Assembly steps of the method entail attaching a second tube to a first tube and a third tube to the second tube. Installation steps of the method entail positioning a rear edge of a first section of the first tube along an intersection of walls of a room and inserting an article of mounting hardware through a respective mounting hole and its associated mounting hole to fixedly attach the first tube to a structural element of at least one of the walls. A final step of the method is attaching a fixture to a connector, which is attached to the third tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
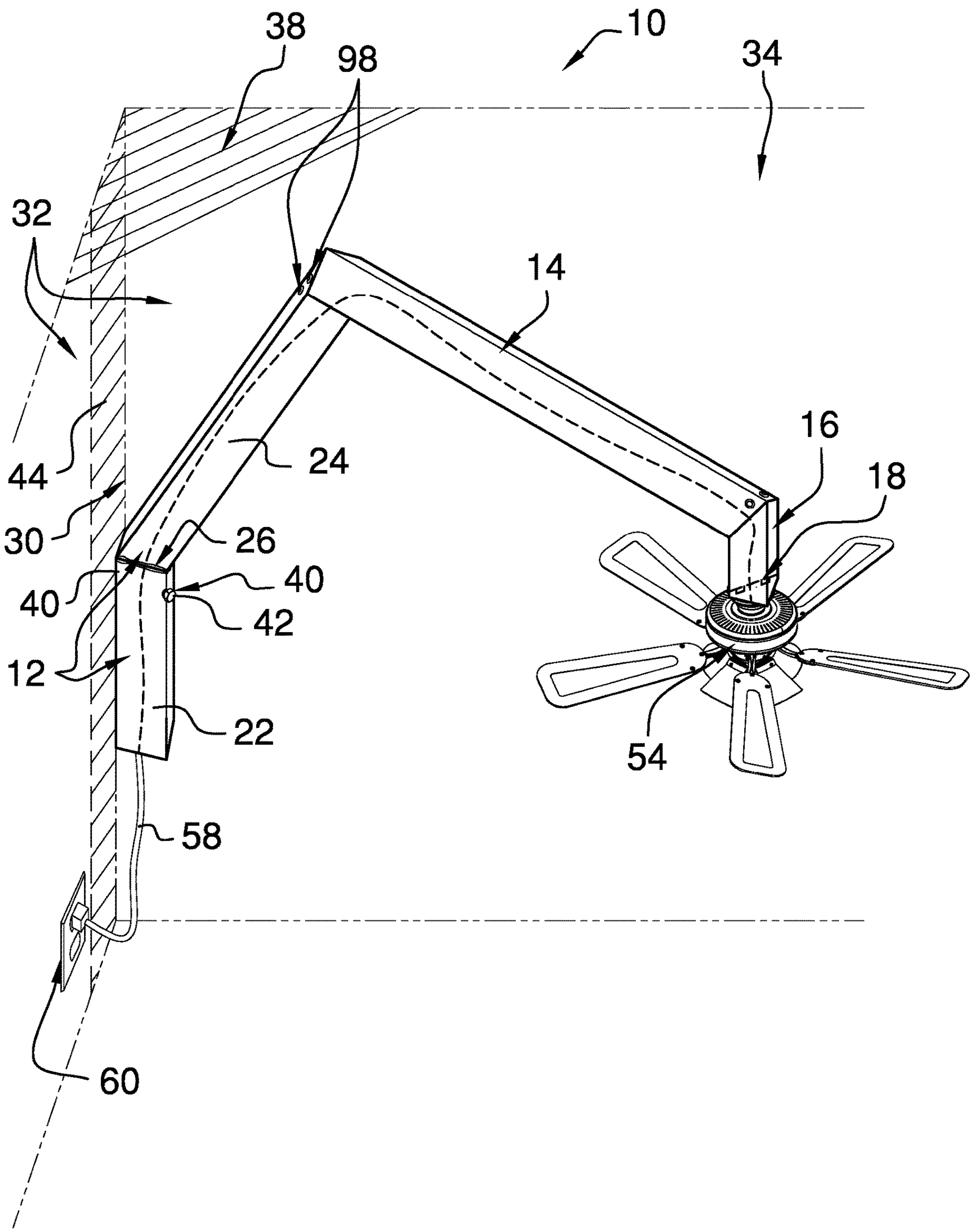
FIG. 1 is an isometric perspective, in-use view of a modular ceiling fixture mounting device according to an embodiment of the disclosure.

With reference now to the drawings, and in particular to FIGS. 1 through 6 thereof, a new fixture mounting device embodying the principles and concepts of an embodiment of the disclosure and generally designated by the reference numeral 10 will be described.

As best illustrated in FIGS. 1 through 6, the modular ceiling fixture mounting device 10 generally comprises a first tube 12, a second tube 14, a third tube 16, and a connector 18. The first tube 12 has a cross-sectional profile 20 that is substantially trapezoidal and comprises a first section 22 and a second section 24, which extends from an upper end 26 of the first section 22. The first tube 12 is formed by welding of the first section 22 and the second section 24. A rear edge 28 of the first section 22 is configured to be positioned along an intersection 30 of walls 32 of a room 34 so that each rear face 36 of a pair of rear faces 36 of the first section 22 abuts a respective one of the walls 32. The second section 24 extends angularly from the first section 22 toward a ceiling 38 of the room 34. The second section 24 may extend from the first section 22 at from 141.0° to 145.0°.

Figure 2:
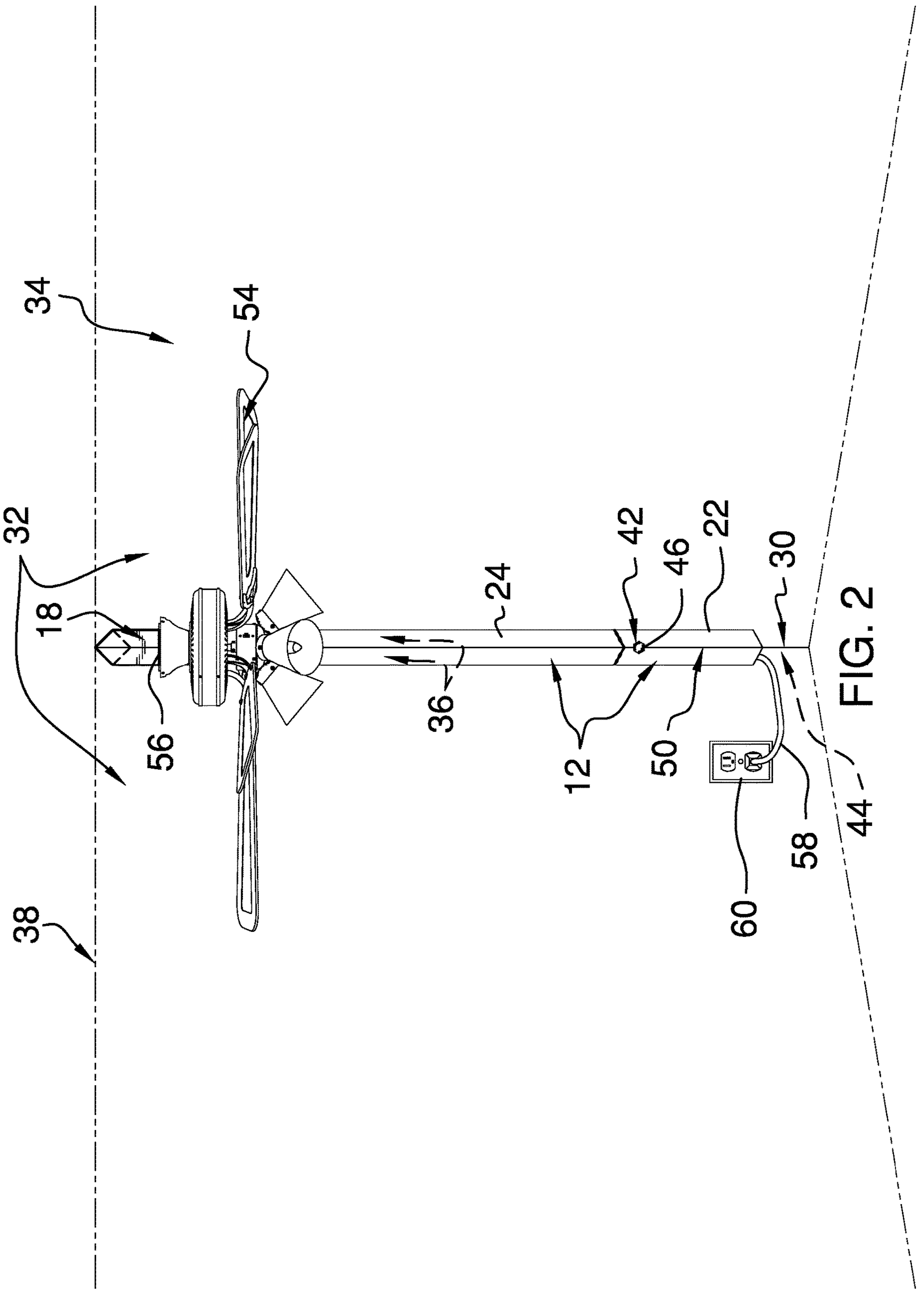
FIG. 2 is a front, in-use view of an embodiment of the disclosure.
Figure 3:
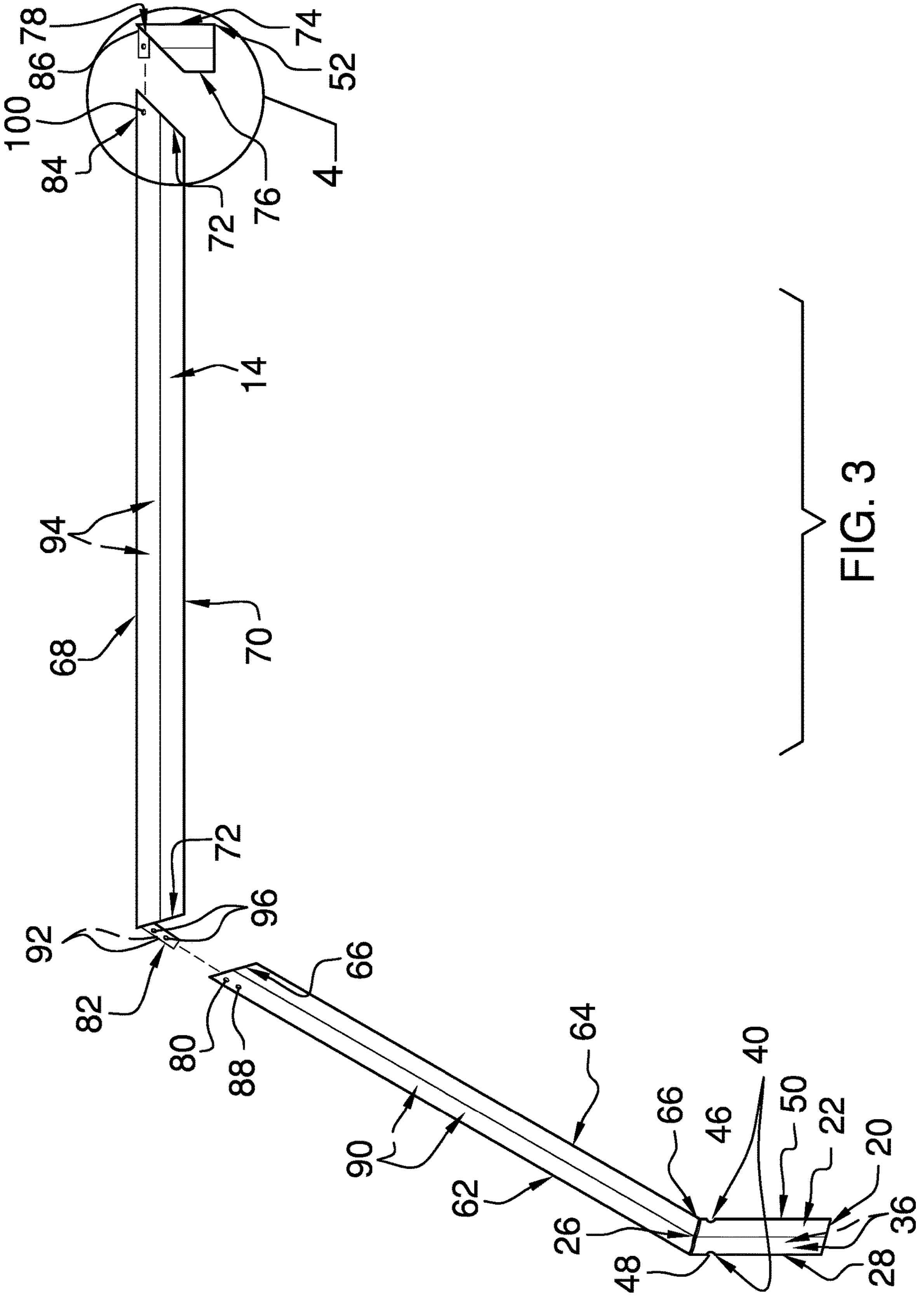
FIG. 3 is an exploded view of an embodiment of the disclosure.

At least two mounting holes 40 are positioned in the first section 22 proximate to the upper end 26. Each mounting hole 40 is aligned with an associated mounting hole 40. The mounting hole 40 and the associated mounting hole 40 are configured for insertion of an article of mounting hardware 42 to fixedly attach the first tube 12 to a structural element 44 of at least one of the walls 32. As shown in FIGS. 2 and 3, the at least two mounting holes 40 comprises a first hole 46 and a second hole 48. The first hole 46 and the second hole 48 are positioned in a front edge 50 and the rear edge 28 of the first section 22, respectively, proximate to the upper end 26. The first hole 46 and the second hole 48 are configured for insertion of the article of mounting hardware 42 to fixedly attach the first tube 12 to the structural element 44 of the at least one of the walls 32. This configuration for mounting a modular ceiling fixture mounting device 10 provides a strong connection, is quick, provides for easy alignment, and is fail safe as the intersection 30 of the walls 32 comprises solid wood for engaging an article of mounting hardware 42.

The second tube 14 is selectively attachable to the second section 24 distal from the first section 22 so that the second tube 14 extends substantially perpendicularly, relative to the first section 22, into the room 34. The third tube 16 is selectively attachable to the second tube 14, distal from the first tube 12, so that the third tube 16 is substantially parallel to the walls 32. The third tube 16 may extend from the second tube 14 at from 87.0° to 91.0°. As such, the third tube 16 would be substantially perpendicular to a ceiling 38 that is horizontal.

As shown in FIGS. 2 and 3, the cross-sectional profile 20 of the first tube 12 is square. The present invention also anticipates the cross-sectional profile 20 of the first tube 12 being irregularly trapezoidal. Thus configured, the modular ceiling fixture mounting device 10 would not evenly bisect the pair of walls 32. This configuration could find use in a rectangular, non-square room 34, by centrally positioning the third tube 16 in the room 34.

The connector 18 is attached to a bottom end 52 of the third tube 16 and is configured to selectively attach to a fixture 54 so that the fixture 54 is suspended in the room 34. The modular ceiling fixture mounting device 10 is anticipated to be useful in hanging light fixtures, ceiling fans, ceiling fans with lights, but also could be used for hanging pots, speakers, televisions, and the like. Such fixtures 54 are decorative and provide comfort and convenience to a user. However, there are situations where such fixtures 54 cannot be installed in the ceiling 38 in a normal manner, such as in rental situations, wherein a user may be prohibited from cutting into and possibly damaging a ceiling 38 to install the fixture 54 and the necessary wiring. Additionally, the ceilings 38 of many multilevel buildings are comprised of concrete, which does not lend itself to facile installation of fixtures 54.

The present invention anticipates the connector 18 comprising a variety of connecting means. For example, the connector 18 may comprise a bar 56, which is attached within the third tube 16 and to which a chain (not shown) hooked to a fixture 54 could be hooked. Many fixtures 54 comprise a threaded hollow bolt (not shown) through which their power cord 58 extends. This threaded hollow bolt could be threadedly inserted through a threaded hole (not shown) in the bar 56 to attach the fixture. Other hanging means used by those skilled in the art of fixture hanging are anticipated by the present invention.

As shown in FIG. 1, the first tube 12, the second tube 14, and the first tube 12 are configured to allow the power cord 58 of the fixture 54 to pass through them to an outlet 60. The present invention also anticipates a guide cap (not shown) which is selectively insertable into a lower end of the first section 22.

As shown in FIG. 3, an upper edge 62 of the second section 24 is dimensionally longer than a lower edge 64 of the second section 24 so that opposed ends 66 of the second section 24 are tapered. An upper limit 68 of the second tube 14 is dimensionally longer than a lower limit 70 of the second tube 14 so that a respective opposing end 72 of second tube 14 is tapered. An outer limit 74 of the third tube 16 is dimensionally longer than an inner limit 76 of the third tube 16 so that a top end 78 of the third tube 16 is tapered and the bottom end 52 of the third tube 16 is substantially perpendicular to the inner limit 76 and outer limit 74.

A first fastener 80 is attached proximate to the respective opposed end 66 of the second section 24. A second fastener 82, which is complementary to the first fastener 80, is attached proximate to one of the opposing ends 72 of the second tube 14. The second fastener 82 is positioned to selectively attach to the first fastener 80 to removably attach the second tube 14 to the first tube 12.

A third fastener 84 is attached proximate to the other of the opposing ends 72 of the second tube 14 so that the third fastener 84 is distal from the second section 24 of the first tube 12 upon attachment of the second fastener 82 to the first fastener 80. A fourth fastener 86, which is complementary to the third fastener 84, is attached proximate to the top end 78 of the third tube 16. The fourth fastener 86 is positioned to selectively attach to the third fastener 84 to removably attach the third tube 16 to the second tube 14.

As shown in FIG. 3, the first fastener 80 comprises a plurality of first fastening holes 88, each of which is positioned in a respective upper facet 90 of the second section 24. The second fastener 82 comprises a pair of end tabs 92, which is positioned in and which extends from the second tube 14. Each end tab 92 is attached to a respective upper face 94 of the second tube 14. A plurality of second fastening holes 96 is positioned in and is equally distributed between the end tabs 92 of the pair of end tabs 92. Each second fastening hole 96 is threaded and in alignment with a respective first fastening hole 88 upon insertion of the pair of end tabs 92 into the second section 24 of the first tube 12.

Each fastening bolt 98 of a plurality of fastening bolts 98 is insertable through a respective first fastening hole 88 and threadedly insertable into an associated second fastening hole 96 to removably attach the second tube 14 to the first tube 12. As is shown in FIG. 3, the second tube 14 is attached to the first tube 12 using four fastening bolts 98. The present invention anticipates other fastening means for attaching the second tube 14 to the first tube 12, such as, but not limited to, an extension of the second tube 14 extending angularly from a respective opposing end 72 of the second tube 14 and being circumferentially smaller than the second tube 14, such that the extension is insertable into the respective opposed end 66 of the second section 24.

Figure 4:
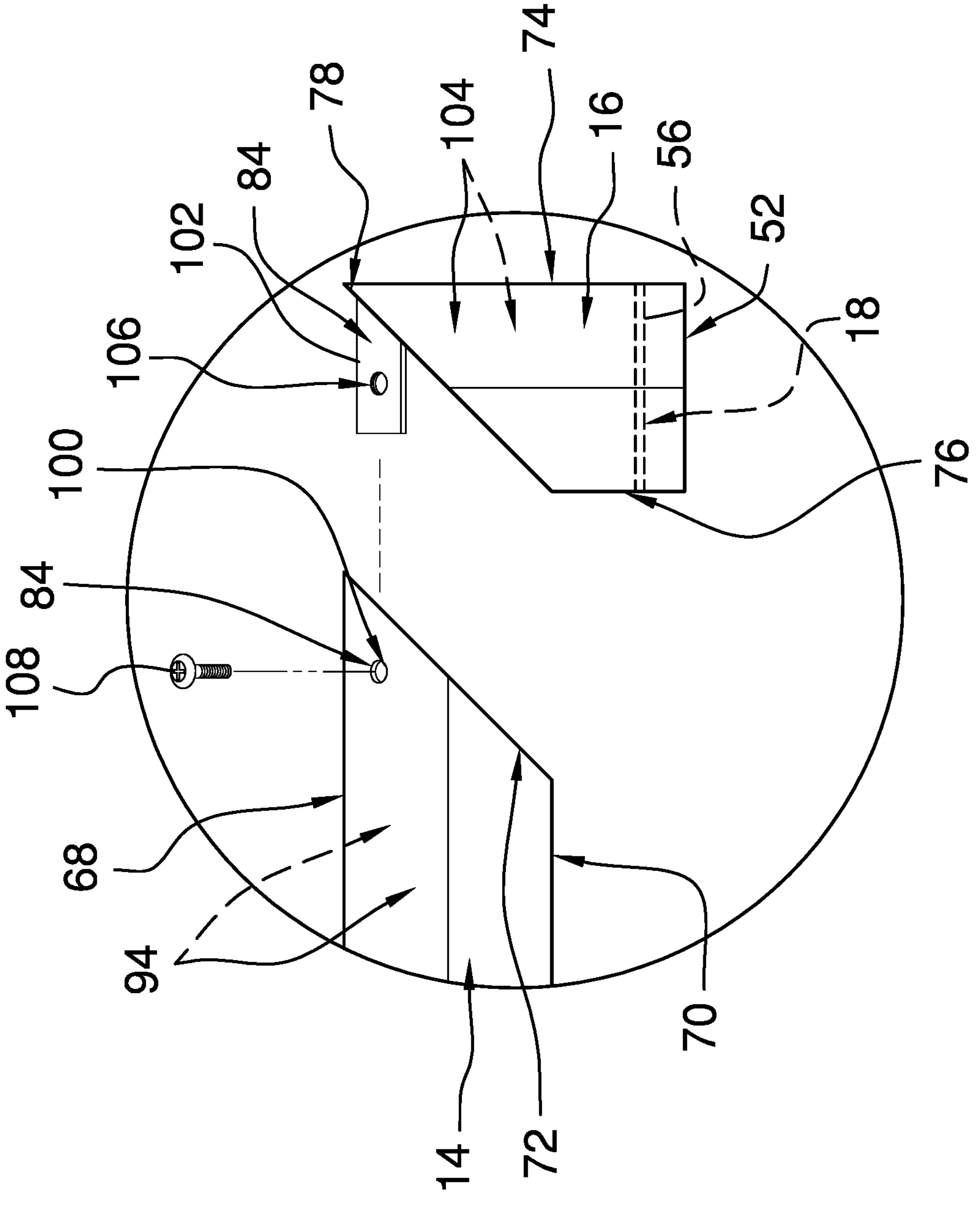
FIG. 4 is a detail view of an embodiment of the disclosure.
Figure 5:
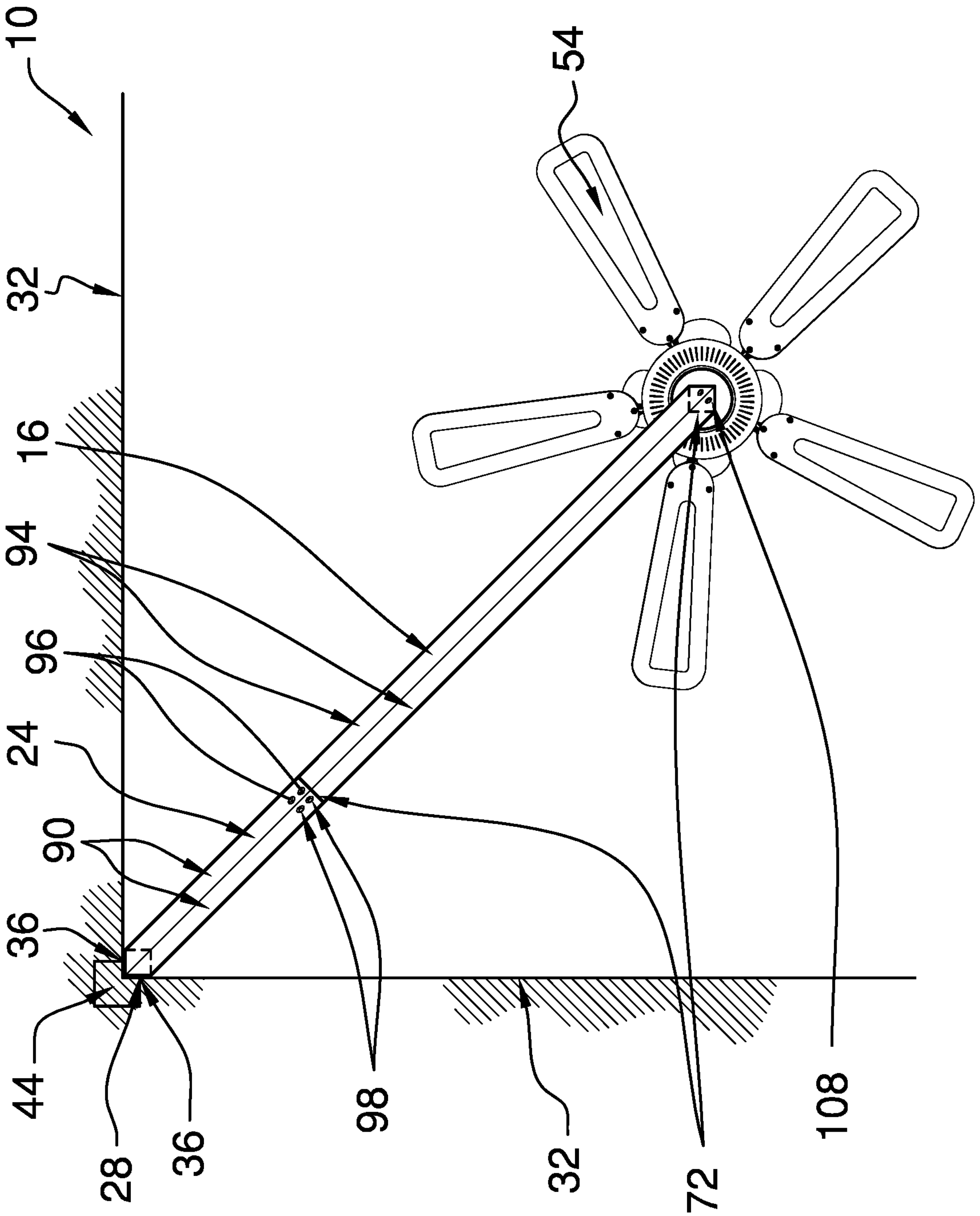
FIG. 5 is a top, in-use view of an embodiment of the disclosure.
Figure 6:
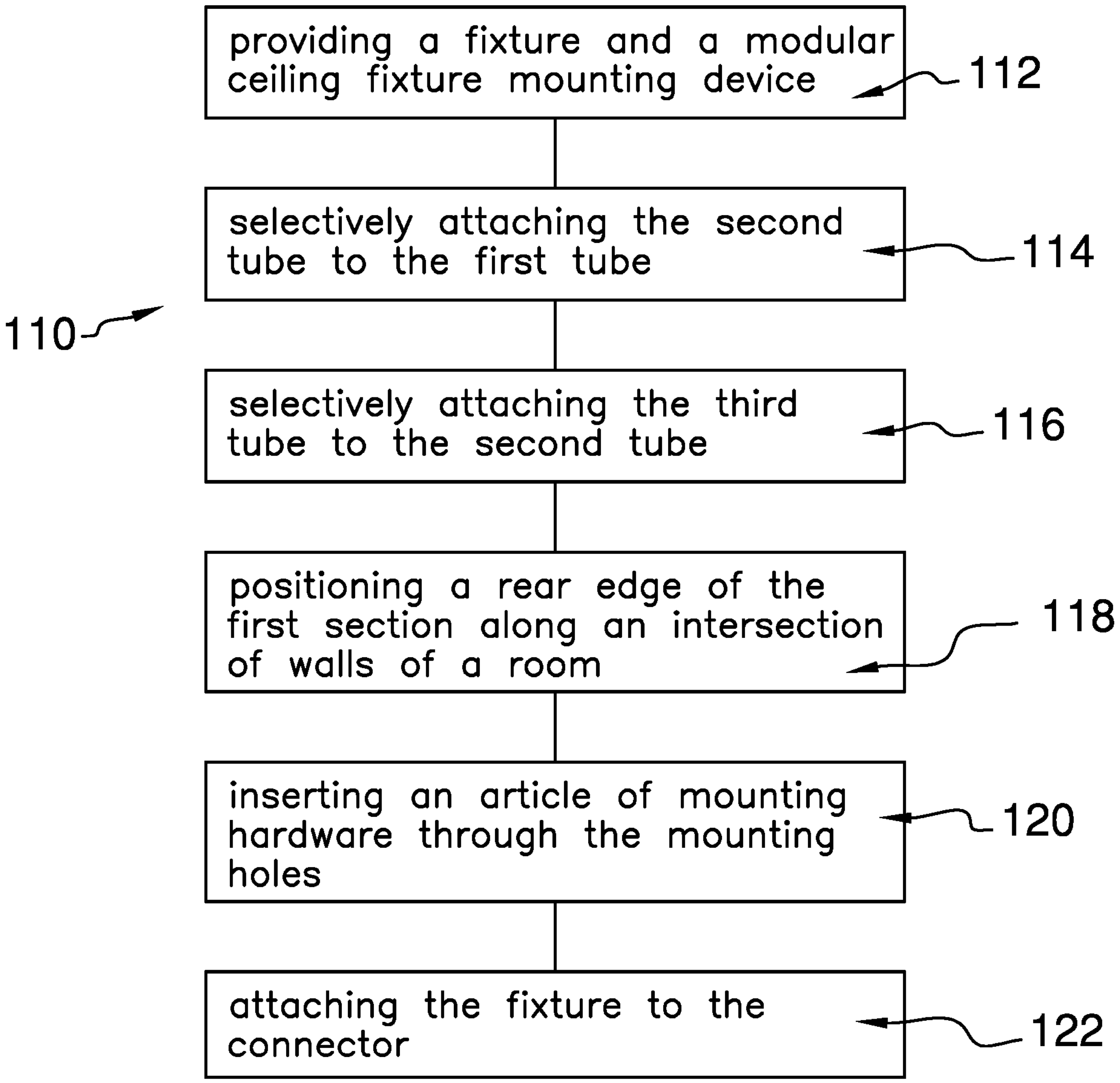
FIG. 6 is a flow diagram for a method utilizing an embodiment of the disclosure.

Also as shown in FIG. 3, the third fastener 84 comprises a plurality of first fastening openings 100, each of which is positioned in a respective upper face 94 of the second tube 14. The fourth fastener 86 comprises a pair of connector tabs 102, which is positioned in and which extends from the third tube 16. Each connector tab 102 is attached to a respective outer face 104 of the third tube 16. A plurality of second fastening openings 106 is positioned in and is equally distributed between the connector tabs 102 of the pair of connector tabs 102. Each second fastening opening 106 is threaded and in alignment with a respective first fastening opening 100 upon insertion of the pair of connector tabs 102 into the second tube 14. Each fastener bolt 108 of a plurality of fastener bolts 108 is insertable through a respective first fastening hole 88 and threadedly insertable into an associated second fastening hole 96 to removably attach the second tube 14 to the first tube 12. As is shown in FIGS. 4 and 5, the third tube 16 is attached to the second tube 14 using two fastener bolts 108.

The modular ceiling fixture mounting device 10 enables a method of mounting a fixture 110. The method 110 comprises a provision step 112, which entails providing a fixture 54 and a modular ceiling fixture mounting device 10, according to the specification above. A first assembly step 114 of the method 110 is selectively attaching the second tube 14 to the first tube 12. A second assembly step 116 of the method 110 is selectively attaching the third tube 16 to the second tube 14. A first installation step 118 of the method 110 is positioning a rear edge 28 of the first section 22 along an intersection 30 of walls 32 of a room 34 so that each rear face 36 of a pair of rear faces 36 of the first section 22 abuts a respective one of the walls 32, and such that the second section 24 extends angularly from the first section 22 toward a ceiling 38 of the room 34. A second installation step 120 of the method 110 is inserting an article of mounting hardware 42 through a respective mounting hole 40 and its associated mounting hole 40 to fixedly attach the first tube 12 to a structural element 44 of at least one of the walls 32.

A final step 122 of the method 110 is attaching the fixture 54 to the connector 18. The present invention anticipates the steps of the method 110 being performed in sequences other than that listed above.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A modular ceiling fixture mounting device comprising:

a first tube having a cross-sectional profile that is substantially trapezoidal, the first tube comprising a first section and a second section extending from an upper end of the first section, wherein a rear edge of the first section is configured for positioning along an intersection of walls of a room, such that each rear face of a pair of rear faces of the first section abuts a respective one of the walls, and such that the second section extends angularly from the first section toward a ceiling of the room;

at least two mounting holes positioned in the first section proximate to the upper end, each mounting hole being aligned with an associated mounting hole, wherein the mounting hole and the associated mounting hole are configured for insertion of an article of mounting hardware for fixedly attaching the first tube to a structural element of at least one of the walls;

a second tube selectively attachable to the second section distal from the first section, such that the second tube extends substantially perpendicularly to the first section into the room;

a third tube selectively attachable to the second tube distal from the first tube, such that the third tube is substantially parallel to the walls; and a connector attached to the third tube distal from the second tube, the connector being configured for selectively attaching to a fixture, such that the fixture is suspended in the room;

wherein an upper edge of the second section is dimensionally longer than a lower edge of the second section, such that opposed ends of the second section are tapered;

wherein an upper limit of the second tube is dimensionally longer than a lower limit of the second tube, such that a respective opposing end of the second tube is tapered;

wherein an outer limit of the third tube is dimensionally longer than an inner limit of the third tube, such that a top end of the third tube is tapered and a bottom end of the third tube is substantially perpendicular to the inner limit and outer limit of the third tube;

a first fastener attached proximate to the respective opposed end of the second section;

a second fastener attached proximate to a one of the opposing ends of the second tube, the second fastener being complementary to the first fastener, such that the second fastener is positioned for selectively attaching to the first fastener for removably attaching the second tube to the first tube;

a third fastener attached proximate to the other of the opposing ends of the second tube, such that the third fastener is distal from the second section of the first tube upon attachment of the second fastener to the first fastener;

a fourth fastener attached proximate to the top end of the third tube, the fourth fastener being complementary to the third fastener, such that the fourth fastener is positioned for selectively attaching to the third fastener for removably attaching the third tube to the second tube;

the first fastener comprising a plurality of first fastening holes, each first fastening hole being positioned in a respective upper facet of the second section;

the second fastener comprising a pair of end tabs positioned in and extending from the second tube, each end tab being attached to a respective upper face of the second tube;

a plurality of second fastening holes positioned in and equally distributed between the end tabs of the pair of end tabs, each second fastening hole being threaded and in alignment with a respective first fastening hole upon insertion of the pair of end tabs into the second section of the first tube;

a plurality of fastening bolts, each fastening bolt being insertable through the respective first fastening hole and threadedly insertable into an associated second fastening hole for removably attaching the second tube to the first tube;

the third fastener comprising a plurality of first fastening openings, each first fastening opening being positioned in a respective upper face of the second tube;

the fourth fastener comprising a pair of connector tabs positioned in and extending from the third tube, each connector tab being attached to a respective outer face of the third tube;

a plurality of second fastening openings positioned in and equally distributed between the connector tabs of the pair of connector tabs, each second fastening opening being threaded and in alignment with a respective first fastening opening upon insertion of the pair of connector tabs into the second tube; and a plurality of fastener bolts, each fastener bolt being insertable through the respective first fastening hole and threadedly insertable into an associated second fastening hole for removably attaching the second tube to the first tube.

2. The modular ceiling fixture mounting device of claim 1, wherein the at least two mounting holes comprises:

a first hole positioned in a front edge of the first section proximate to the upper end; and a second hole positioned in the rear edge, wherein the first hole and the second hole are configured for insertion of the article of mounting hardware for fixedly attaching the first tube to the structural element of the at least one of the walls.

3. The modular ceiling fixture mounting device of claim 1, wherein:

the second section extends from the first section at from 141.0° to 145.0°; and the third tube extends from the second tube at from 87.0° to 91.0°.

4. The modular ceiling fixture mounting device of claim 1, wherein the first tube is formed by welding of the first section and the second section.

5. A modular ceiling fixture mounting device comprising:

a first tube, the first tube comprising a first section and a second section extending from an upper end of the first section, wherein a rear edge of the first section is configured for positioning along an intersection of walls of a room, such that each rear face of a pair of rear faces of the first section abuts a respective one of the walls, and such that the second section extends angularly from the first section toward a ceiling of the room;

at least two mounting, holes positioned in the first section proximate to the upper end, each mounting hole being aligned with an associated mounting hole, wherein the mounting hole and the associated mounting hole are configured for insertion of an article of mounting hardware for fixedly attaching the first tube to a structural element of at least one of the walls;

a second tube selectively attachable to the second section distal from the first section, such that the second tube extends substantially perpendicularly to the first section into the room;

a third tube selectively attachable to the second tube distal from the first tube, such that the third tube is substantially parallel to the walls; and a connector attached to the third tube distal from the second tube, the connector being configured for selectively attaching to a fixture, such that the fixture is suspended in the room;

wherein an upper edge of the second section is dimensionally longer than a lower edge of the second section, such that opposed ends of the second section are tapered;

wherein an upper limit of the second tube is dimensionally longer than a lower limit of the second tube, such that a respective opposing end of the second tube is tapered;

wherein an outer limit of the third tube is dimensionally longer than an inner limit of the third tube, such that a top end of the third tube is tapered and a bottom end of the third tube is substantially perpendicular to the inner limit and outer limit of the third tube;

a first fastener attached proximate to the respective opposed end of the second section;

a second fastener attached proximate to a one of the opposing ends of the second tube, the second fastener being complementary to the first fastener, such that the second fastener is positioned for selectively attaching to the first fastener for removably attaching the second tube to the first tube;

a third fastener attached proximate to the other of the opposing ends of the second tube, such that the third fastener is distal from the second section of the first tube upon attachment of the second fastener to the first fastener;

a fourth fastener attached proximate to the top end of the third tube, the fourth fastener being complementary to the third fastener, such that the fourth fastener is positioned for selectively attaching to the third fastener for removably attaching the third tube to the second tube;

the first fastener comprising a plurality of first fastening holes, each first fastening hole being positioned in a respective upper facet of the second section;

the second fastener comprising a pair of end tabs positioned in and extending from the second tube, each end tab being attached to a respective upper face of the second tube;

a plurality of second fastening holes positioned in and equally distributed between the end tabs of the pair of end tabs, each second fastening hole being threaded and in alignment with a respective first fastening hole upon insertion of the pair of end tabs into the second section of the first tube;

a plurality of fastening bolts, each fastening bolt being insertable through a respective first fastening hole and threadedly insertable into an associated second fastening hole for removably attaching the second tube to the first tube;

the third fastener comprising a plurality of first fastening openings, each first fastening opening being positioned in a respective upper face of the second tube;

the fourth fastener comprising a pair of connector tabs positioned in and extending from the third tube, each connector tab being attached to a respective outer face of the third tube;

a plurality of second fastening openings positioned in and equally distributed between the connector tabs of the pair of connector tabs, each second fastening opening being threaded and in alignment with a respective first fastening opening upon insertion of the pair of connector tabs into the second tube;

a plurality of fastener bolts, each fastener bolt being insertable through a respective first fastening hole and threadedly insertable into an associated second fastening hole for removably attaching the second tube to the first tube; and wherein the cross-sectional profile of the first tube is square.

6. A modular ceiling fixture mounting device comprising:

a first tube having a cross-sectional profile that is one of substantially trapezoidal and square, the first tube comprising a first section and a second section extending from an upper end of the first section, wherein a rear edge of the first section is configured for positioning along an intersection of walls of a room, such that each rear face of a pair of rear faces of the first section abuts a respective one of the walls, and such that the second section extends angularly from the first section toward a ceiling of the room, the second section extending from the first section at from 141.0° to 145.0°, an upper edge of the second section being dimensionally longer than a lower edge of the second section, such that opposed ends of the second section are tapered, the first tube being formed by welding of the first section and the second section;

at least two mounting holes positioned in the first section proximate to the upper end, each mounting hole being aligned with an associated mounting hole, wherein the mounting hole and the associated mounting hole are configured for insertion of an article of mounting hardware for fixedly attaching the first tube to a structural element of at least one of the walls, the at least two mounting holes comprising:

a first hole positioned in a front edge of the first section proximate to the upper end, and a second hole positioned in the rear edge, wherein the first hole and the second hole are configured for insertion of the article of mounting hardware for fixedly attaching the first tube to the structural element of the at least one of the walls;

a second tube selectively attachable to the second section distal from the first section, such that the second tube extends substantially perpendicularly to the first section into the room, an upper limit of the second tube being dimensionally longer than a lower limit of the second tube, such that a respective opposing end of the second tube is tapered;

a third tube selectively attachable to the second tube distal from the first tube, such that the third tube is substantially parallel to the walls, the third tube extending from the second tube at from 87.0° to 91.0°, an outer limit of the third tube being dimensionally longer than an inner limit of the third tube, such that a top end of the third tube is tapered and a bottom end of the third tube is substantially perpendicular to the inner limit and outer limit of the third tube;

a connector attached a bottom end of third tube, the connector being configured for selectively attaching to a fixture, such that the fixture is suspended in the room;

a first fastener attached proximate to the respective opposed end of the second section, the first fastener comprising a plurality of first fastening holes, each first fastening hole being positioned in a respective upper facet of the second section;

a second fastener attached proximate to a one of the opposing ends of the second tube, the second fastener being complementary to the first fastener, such that the second fastener is positioned for selectively attaching to the first fastener for removably attaching the second tube to the first tube, the second fastener comprising a pair of end tabs positioned in and extending from the second tube, each end tab being attached to a respective upper face of the second tube;

a plurality of second fastening holes positioned in and equally distributed between the end tabs of the pair of end tabs, each second fastening hole being threaded and in alignment with a respective first fastening hole upon insertion of the pair of end tabs into the second section of the first tube;

a plurality of fastening bolts, each fastening bolt being insertable through a respective first fastening hole and threadedly insertable into an associated second fastening hole for removably attaching the second tube to the first tube;

a third fastener attached proximate to the other of the opposing ends of the second tube, such that the third fastener is distal from the second section of the first tube upon attachment of the second fastener to the first fastener, the third fastener comprising a plurality of first fastening openings, each first fastening opening being positioned in a respective upper face of the second tube;

a fourth fastener attached proximate to the top end of the third tube, the fourth fastener being complementary to the third fastener, such that the fourth fastener is positioned for selectively attaching to the third fastener for removably attaching the third tube to the second tube, the fourth fastener comprising a pair of connector tabs positioned in and extending from the third tube, each connector tab being attached to a respective outer face of the third tube;

a plurality of second fastening openings positioned in and equally distributed between the connector tabs of the pair of connector tabs, each second fastening opening being threaded and in alignment with a respective first fastening opening upon insertion of the pair of connector tabs into the second tube; and a plurality of fastener bolts, each fastener bolt being insertable through a respective first fastening hole and threadedly insertable into an associated second fastening hole for removably attaching the second tube to the first tube.

* * * * *